April 16, 1963 G. LESSMAN 3,085,371
PRECISION POSITIONING APPARATUS
Filed Aug. 8, 1960 4 Sheets-Sheet 1
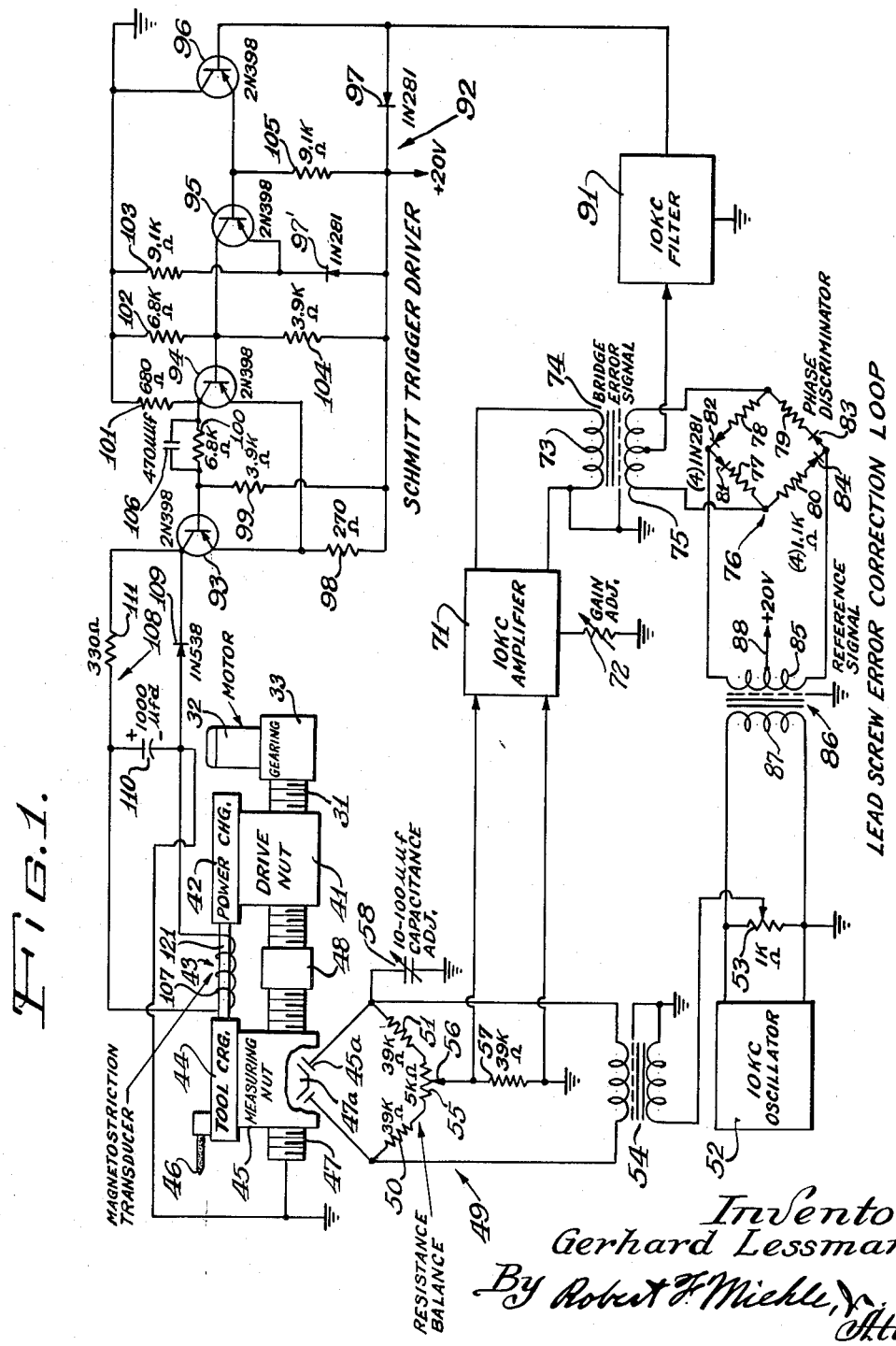
Inventor:
Gerhard Lessman
By Robert F. Miehle, Jr.
Atty.

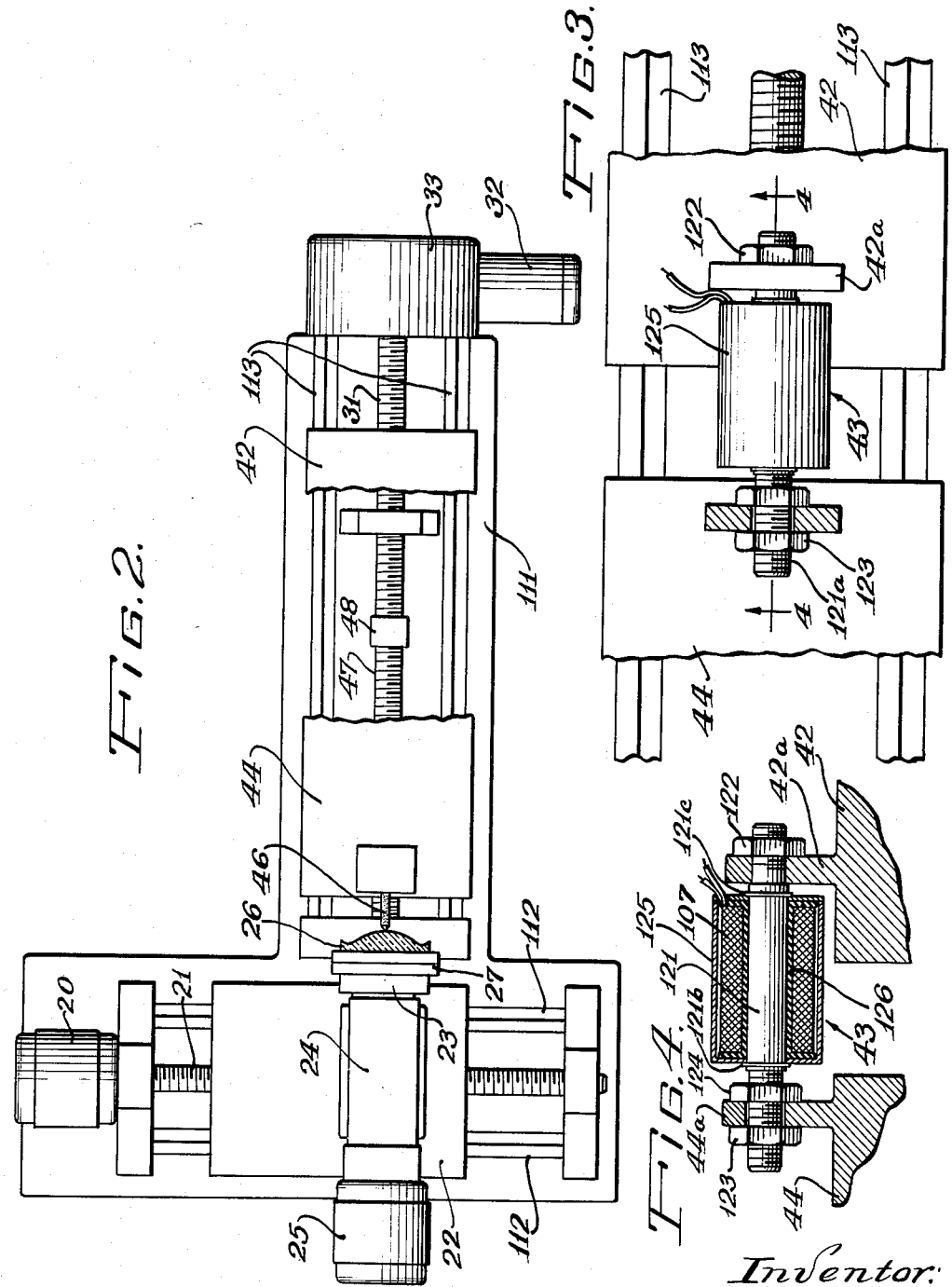

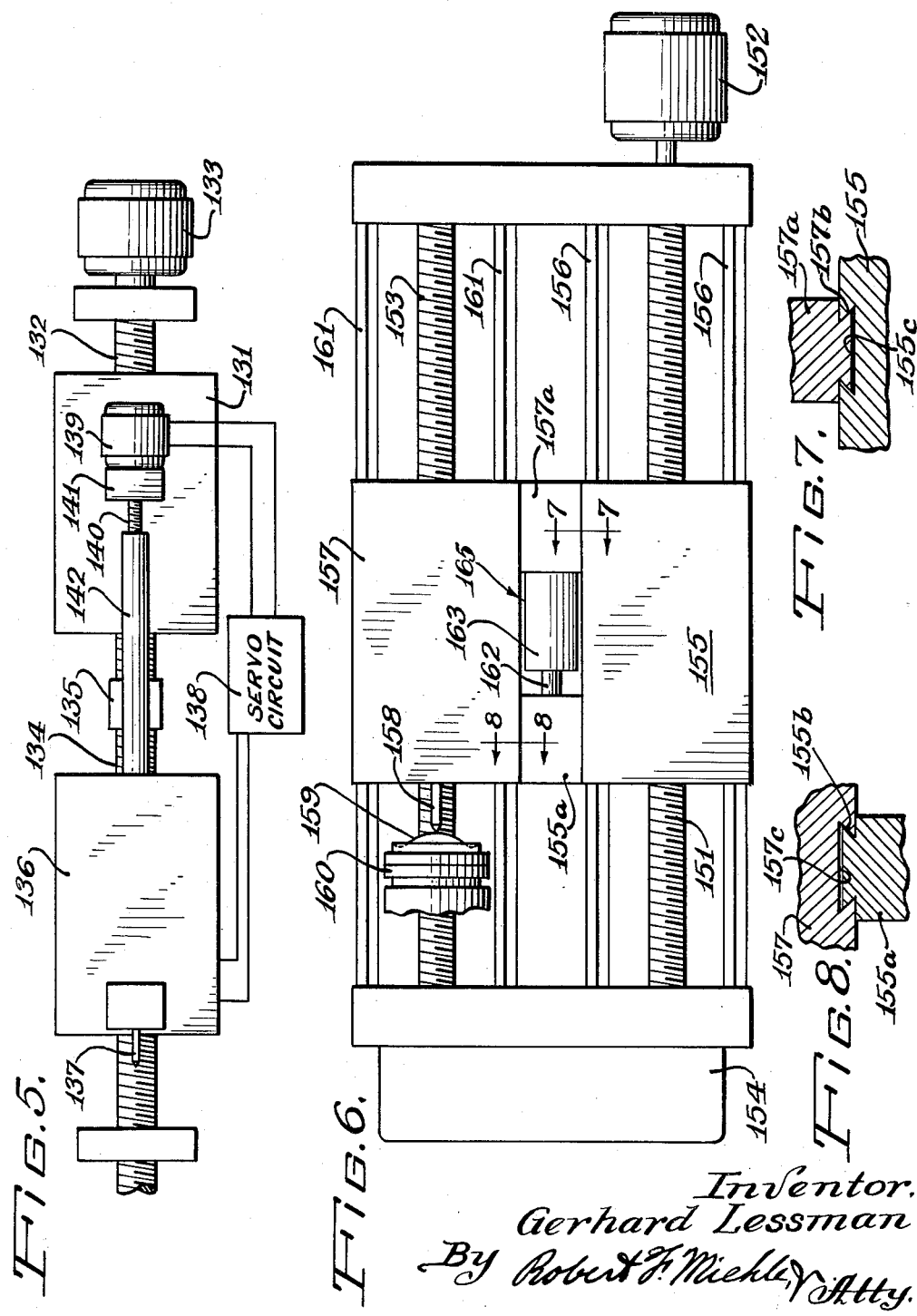

April 16, 1963

G. LESSMAN 3,085,371

PRECISION POSITIONING APPARATUS

Filed Aug. 8, 1960

Inventor.
Gerhard Lessman
By Robert F. Miehle, Atty.

United States Patent Office 3,085,371
Patented Apr. 16, 1963

3,085,371
PRECISION POSITIONING APPARATUS
Gerhard Lessman, Evanston, Ill., assignor to Bell & Howell Company, Chicago, Ill., a corporation of Illinois
Filed Aug. 8, 1960, Ser. No. 48,024
9 Claims. (Cl. 51—165)

This invention relates to precision positioning apparatus, and more particularly to apparatus for precisely positioning a tool for grinding aspheric lens surfaces.

An object of the invention is to provide new and improved apparatus for precisely positioning a member.

Another object of the invention is to provide machines for contouring or shaping articles to accuracies of within one millionth of an inch.

Another object of the invention is to provide an apparatus for advancing a tool carriage in which the position of the tool is continuously sensed and is corrected automatically if the position is incorrect.

Another object of the invention is to provide an apparatus having a drive carriage together with a tool carriage connected to the driven carriage by a transducer, a measuring screw rotated in synchronism with movement of the drive carriage having electroconductive thread, the tool carriage having conductive thread portions interleaving the thread of the screw and forming a pair of capacitors therewith, and a bridge circuit responsive to unbalance of the capacitors for actuating the transducer to move the tool carriage relative to the screw and the drive carriage to rebalance the capacitors, thereby bringing the tool carriage to a precise desired position.

A further object of the invention is to provide apparatus for grinding an aspheric lens in which the lens blank is rotated, the blank and an abrading tool are moved relative to one another in a direction transverse to the axis of rotation of the blank, the tool and the blank are moved relative to one another parallel to the axis of rotation in response to a signal pattern in synchronism with the transverse movement, and errors in the parallel movement are sensed by an electrostatic capacitor screw and nut and are corrected by a transducer actuated by the screw.

Another object of the invention is to provide a new and improved electrostrictive transducer.

A complete understanding of the invention may be obtained from the following detailed description of apparatus forming specific embodiments thereof, when read in conjunction with the appended drawings, in which:

FIG. 1 is a schematic view of a portion of a precision positioning apparatus forming one embodiment thereof and including a control circuit therefor shown partially in block diagram;

FIG. 2 is a top plan view of the apparatus of FIG. 1;

FIG. 3 is an enlarged top plan view of the apparatus of FIG. 1;

FIG. 4 is a vertical section taken along line 4—4 of FIG. 3;

FIG. 5 is a top plan view of an apparatus forming an alternate embodiment of the invention;

FIG. 6 is a top plan view of an apparatus forming another embodiment of the invention;

FIG. 7 is an enlarged vertical section taken along line 7—7 of FIG. 6;

FIG. 8 is is an enlarged vertical section taken along line 8—8 of FIG. 6;

Figure 9:
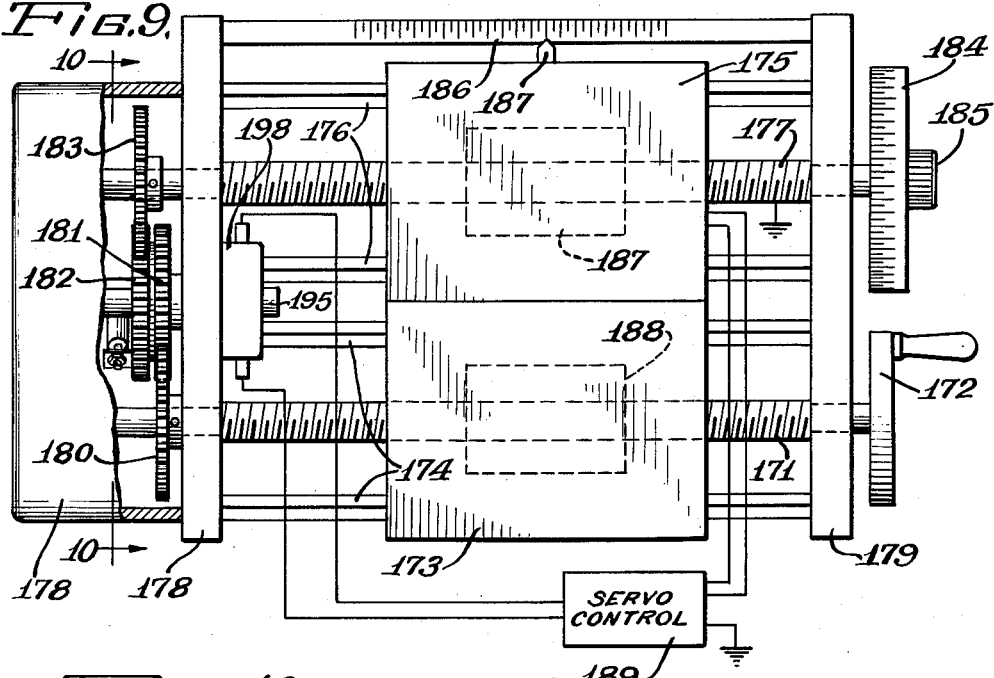
FIG. 9 is a top plan view of a precision positioning apparatus forming another embodiment of the invention.

The invention provides precision positioning apparatus which, in some of the shown embodiments, are for the purpose of abrading aspheric surfaces on lens blanks but may be used for many other purposes. In the apparatus shown, a member to be precisely positioned is carried by a carriage, its position is sensed and a transducer device is actuated by the position sensing means to correct any error in the position of the member. Preferably there is provided a measuring nut moved by a drive carriage driven by a feed screw precise within a given range of error, and a measuring screw coaxial with the measuring nut is rotated by the feed screw. The measuring screw has an electroconductive thread which overlaps insulated electroconductive facings of the measuring nut and forms two capacitors therewith. Whenever the drive of the drive carriage is in error, the facings are not centered between the thread of the measuring screw and a bridge circuit connected to the capacitors to detect unbalance therebetween actuates a servo device to actuate a transducer device to center the measuring nut thread and the measuring screw thread. The transducer device may include a magnetostrictive member coupling the drive carriage and the measuring nut to move the measuring nut relative to the drive nut in a direction such as to balance the two capacitors.

Referring now in detail to the drawings, there is shown in FIG. 2 a motor 20, which is to rotate a very accurate work screw 21 continuously at a predetermined rate of speed. Rotation of the screw advances a work carriage 22 therealong, and the carriage carries a spindle 23 thereon in a bearing structure 24 together with a spindle driving motor 25 to rapidly rotate the spindle together with a lens blank 26 carried by a blocking member or work holder 27 centered on and fixed rigidly to the spindle. As the carriage 22 is moved along the screw 21, a tool drive screw 31 is rotated through a predetermined small angle by a known stepping motor 32 and known reduction gearing 33. The drive screw is very precise and has an error within known limits.

The drive screw 31, when rotated, serves to drive a known drive nut 41 (FIG. 1) along an axis which is designated the Y axis and is transverse to the X axis along which the work feed screw 21 extends. The drive nut is rigidly connected to a power carriage 42, which is rigidly connected by a magnetostrictive transducer device 43 to a tool carriage 44. The tool carriage 44 carries a measuring nut 45 and a known abrading tool 46 rigidly thereon. The tool 46 may be non-rotating as shown or may be rotated by a motor (not shown) on the tool carriage. The measuring nut 45 extends along a portion of a measuring screw 47, and, with the screw 47 forms an electrostatic screw measuring device of the type disclosed and claimed in co-pending application Serial No. 824,665, filed July 2, 1959, by Gerhard Lessman and assigned to the common assignee, now Patent No. 3,030,578, dated April 17, 1962. The measuring screw is aligned with the drive screw 31 and is drivingly connected thereto by a rigid coupling 48. The pitches of the threads of the screws 31 and 47 and the nuts 41 and 45 are equal.

Threads 47a of the screw 47 and 45a of the nut 45 overlap one another and form two capacitors which are connected in adjacent arms of a bridge circuit 49 forming a part of a servo control. The capacitances of these two capacitors are equal only when the nut 45 is in the desired position thereof along the screw 47 and when the nut 45 is in a position shifted along the screw 47 from its desired position, one of the capacitors increases in capacitance and the other decreases, both changes being proportional to the square of the distance of shift or longitudinal decentering. The bridge circuit 49 also includes equal resistors 50 and 51 in its other arms and is supplied with power from an oscillator 52, a voltage divider 53 and a transformer 54. The bridge also includes a trimming or balancing variable resistor 55 whose contactor 56 is connected to voltage divider 57 forming the output of the bridge circuit and receiving any error output from the bridge circuit due to any occurring inequality of the pair of capacitors formed by the threads 45a and 47a. An adjustable capacitor 58 connects one corner of the input of the bridge circuit to ground.

Any error output of the bridge circuit 49 is fed to a known amplifier 71 adapted to amplify ten kilocycle frequency signals and having a rheostat 72 for initially adjusting the gain thereof. The amplified error signal is fed to a winding 73 of a transformer 74 which also has a center tapped winding 75. The center tapped winding 75 has its ends connected to a phase discriminator circuit 76 including resistors 77 to 80 and rectifiers 81 to 84 and connected at its input to center tapped secondary winding 85 of transformer 86, primary winding 87 thereof being supplied by the oscillator 52. The center of the winding 85 is supplied with a constant positive D.C. voltage by conductor 88 leading to a known D.C. source (not shown). The phase discriminator circuit serves to detect the error signal by the phase difference between the reference signal and the error signal. An input diode 97 cancels out any pulses from the bridge circuit which are due to overtravel or lead of nut 45 from its desired centered position when the nut 45 is being driven to the left as viewed in FIG. 1. Normally such pulses from lead of the nut 45 do not occur because the nut 45 is coupled to the power or drive carriage 42 so that, with no current supplied to the coupling magnetostrictive device 43, the nut 45 will lag from its desired longitudinally centered position relative to the thread 47a of screw 47. However, this lag is never great enough to cause the thread 47a to engage the thread 45a of the nut. Hence, only error signal due to lag of the nut 45, the term lag being designated to be lag for driving movement of the nut 45 to the left, is utilized for error compensation.

The lag and lead error signals are fed with the ten kilocycle frequency reference signal to a ten kilocycle filter 91 of a known type which filters out the reference signals leaving only the amplified error signals or pulses, which then are fed to a trigger circuit 92 of a known type. The trigger circuit includes transistors 93 to 96, diode rectifiers 97 and 97', resistors 98 to 105 and a capacitor 106. The rectifier 97 cancels out lead error signals. The trigger circuit is turned on when the D.C. input thereto rises above its threshold voltage, which occurs only for each error input pulse of a magnitude at least as great as that of an error pulse produced by a lag of the nut 45 from its desired position of one-half of one micro-inch. The output of the trigger circuit is applied to a winding 107 of the transducer 43 by means of a resistance-capacitance network 108 and a rectifier 109. The network 108 includes capacitor 110 and resistor 111 and serves to slow and prolong the application of the error correcting power to the transducer 43. Current through the coil 107 causes magnetostrictive core 121 to elongate in accordance with the power supplied to the coil 107, and the core 121, which rigidly connects the carriages 42 and 44, pushes the carriage 44 to the left, as viewed in FIG. 1, toward its desired position in which the thread 45a of the nut 45 is longitudinally centered relative to the thread 47a of the measuring screw 47. The duration of the power pulses of the trigger circuit are dependent on the duration of error signals coming to the trigger circuit. Normally sufficient correction to the nut 45 to bring the error under one-half micro-inches occurs almost instantaneously, and the trigger circuit is shut off. However, power continues to be supplied to the transducer from the resistance-capacitance circuit 108 in magnitude and duration dependent on the time constant of the circuit 108, which has the effect of keeping the nut 45 (and thereby the tool 46) within the one-half micro-inch range of accuracy for a longer period of time. The circuit 108 and the magnitude of the power output from the trigger circuit 92 are such that overshooting and hunting are prevented. Certain features of the lead screw error correction circuit described above are disclosed in co-pending application Serial No. 47,992, filed on the same day as this application by Marvin F. Royston and assigned to the common assignee.

Synchronization of the drives of the feed screws 21 and 31 is effected by a numerical control system (not shown) driving the screw 31 in response to command signals caused by selected rotations of the screw 21. The control system is disclosed in detail and certain features thereof are claimed in above mentioned co-pending application Serial No. 47,992, filed by Marvin F. Royston.

The structural features of the machine are shown in more detail in FIGS. 2 to 4. The machine includes a T-shaped, rigid frame 111 on which ways 112 and ways 113 are provided to slidably support the work carriage 22, the drive carriage 42 and the tool carriage 44. The frame also supports the feed screw 21 for rotation and against longitudinal movement thereof, and the screws 31 and 47 rotatably and against longitudinal movement. The motors 20 and 32 and the gear box or reducer 33 also are supported in fixed positions on the frame 111. The motor 25 is supported on the carriage 22.

The transducer 43 includes a core 121 of known magnetostrictive material which elongates when subjected to a magnetic field. The core 121 is fixed rigidly by screw 122 to lug 42a on the carriage 42 and is connected adjustably for calibration to lug 44a of carriage 44 by nuts 123 and 124 threaded on a threaded end portion 121a of the core 121. Collars 121b and 121c hold shielding tube 125 on the core, the tube 125 forming a low reluctance path around the ends and exterior of the coil 107, which is mounted on dielectric spool 126.

In FIG. 5 there is shown an alternate embodiment of the invention including a power carriage 131 driven by a feed screw 132, which is accurate within a small range of error and driven by motor 133. The screw 132 also turns electrostatic screw 134 through coupling 135 fixed rigidly to these screws. The screw 134 is similar to the screw 47 and turns inside an electrostatic nut (not shown) like the nut 45 and carried rigidly on tool carriage 136. The carriage 136 also carries cutting tool 137. A servo circuit 138 like the circuits 49, 52, 76, 91 and 92 (FIG. 1) and also including a known reverse switch (not shown) serves to supply power to reversible motor 139 to turn worm 140 through reduction gearing 141 to move relative to carriage 131 a rack 142 fixed rigidly at one end to carriage 136. The direction of movement of the motor 139 which is mounted rigidly on carriage 131 is dependent on the direction of unbalance between the electrostatic nut and screw 134 and toward moving the carriage 136 and electrostatic nut toward their precisely correct positions. If desired, instead of having the motor 139 reversible, it may be operable in one direction only and spring biased toward a zero or starting position to which it always returns when there is no power to the motor, the reversing switch means of the circuit 138 being omitted in this construction and the electrostatic nut normally being positioned to one side of its longitudinally centered position relative to the screw thread in this instance.

In the embodiment of the invention shown in FIGS. 6 to 8, feed screw 151 driven by motor 152 drives parallely positioned electrostatic screw 153 by means of gearing in gear transmission 154, and also moves drive carriage 155 along ways 156. A magnetostrictive transducer 165 rigidly connects the carriage 155 to a measuring or tool carriage 157 carrying tool 158 for cutting lens blank 159 rotated by spindle driven work holder 160. The carriage 157 is slidable on ways 161 and carries an electrostatic nut (not shown) along the screw 153. The carriages 155 and 157 have respective rigid lugs 155a and 157a having dovetail portions 155b and 157b slidably mounted in dovetail grooves 157c and 155c. A magnetostrictive core 162 is connected rigidly at its ends to the lugs 155a and 157a, and a coil structure 163 encloses a predetermined portion of the core. The screw 151 moves the carriages 155 and 157 and drives the screw 153 in synchronism with the movement of the carriage 157. A suitable servo circuit (not shown) such as that shown in FIG. 1 actuated by the screw 153 and its associated electrostatic nut serves to actuate the transducer 163 to slide the carriage 157 relative to carriage 155 to correct error in the position of the carriage 157.

Figure 10:
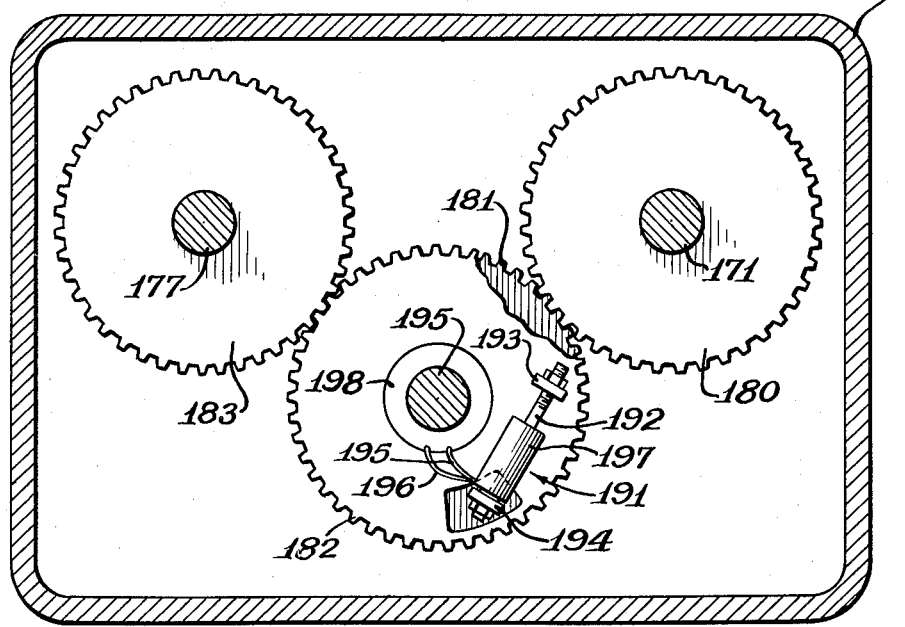
FIG. 10 is an enlarged vertical section taken along line 10—10 of FIG. 9.

The embodiment of the invention shown in FIGS. 9 and 10 comprises a measuring type of servo system rather than the tool setting types as disclosed in the above described embodiments. A feed screw 171 may be rotated by a motor or manually by a crank 172 to advance a power carriage 173 through a drive nut 188. The carriage 173 is slidable along ways 174 and moves therewith a tool or measuring carriage 175, which may carry a tool or an article (not shown). The carriage 175 carries an electrostatic measuring nut 187 like the nut 45 (FIG. 1) and is slidable along ways 176 (FIG. 9) paralleling electrostatic measuring screw 177. The screws 171 and 177 are journalled in frame members 178 and 179, and are interconnected for synchronous rotation by gears 180, 181, 182 and 183. A dial 184 is keyed to the screw 177 and a stationary vernier 185 is provided to read the position of the crew 177 and thereby read the position of the carriage 175 for one revolution of the screw 177, a stationary scale 186 being provided to be read by pointer 187 for the rough measurement.

The screw 171 is very accurate but will have non-accumulative error within known limits in feeding the carriages 173 and 175, and, to accurately center the thread of the measuring screw 177, whose thread is much more precise throughout its length than the screw 171, longitudinally relative to the electrostatic measuring nut 187, a magnetostrictive transducer 191 (FIG. 10) is driven by a servo control 189 similar to the servo control circuit shown in FIG. 1 and described above to adjust the driving connection between the screws 171 and 177. A magnetostrictive rod 192 is connected rigidly and adjustably at one end to a lug 193 fixed to idler gear 182 and is connected rigidly at its other end to lug 194 fixed to idler gear 181. The gear 181 meshes with the gear 180 key to drive screw 171 and is freely rotatable on shaft 195 to which the gear 182 is fixed. The gear 182 meshes with gear 183 keyed to the measuring screw 177. Leads 195 and 196 from a coil enclosed in shield or cover 197 are connected through a known slip ring device 198 to the servo control 189.

The magnetostrictive rod 192 may be either of the type which contracts when subjected to a magnetic field or of the other type which elongates when subjected to a magnetic field, and will be considered to be of the latter type. In movement of the carriages 173 and 177 to the left, as viewed in FIG. 9, with no power supplied to the transducer 191 (FIG. 10), the thread of the electrostatic measuring nut 187 will lead the thread of the measuring screw 177 from the longitudinally centered positions. This normal decentered condition will actuate the servo control 189 to supply power to the transducer 191 in accordance with the degree of decentering, and the rod 192 will be elongated to turn the screw 177 further to precisely center its thread relative to the electrostatic nut 187, and the position of the carriage 175 may be determined by the reading of the scale 186 and dial 184 to within one microinch.

While the invention is thus described, it is not wished to be limited to the precise details described, as changes may be readily made without departing from the spirit of the invention.

What is claimed is:

1. In a machine control, a pair of members movable relative to one another, means accurate within predetermined limits for feeding one of said members, means for sensing the position of said one member, and transducer means responsive to the sensing means for adjusting said one member relative to the feeding means to compensate for error in the feed of the member by said feeding means.

2. In a machine control, a feed carriage, a tool carriage, means connecting the tool carriage for driving movement by the feed carriage, means for advancing the feed carriage, an electrostatic measuring nut carried by the tool carriage, an electrostatic measuring screw rotatable in synchronism with the advancing means, circuit means connected to the nut and the screw for sensing error in the advancement of the nut, and transducer means actuated by the circuit means to adjust the position of the tool carriage so as to compensate for error in the feed of the feed carriage by the advancing means.

3. In a machine, a member, a first carriage for moving the member along a predetermined path, feed means for moving the carriage along the predetermined path with a predetermined accuracy, electrical means for measuring the position of the member, and magnetostrictive means connecting the member adjustably to the carriage and operable by the electrical means to adjust the member relative to the carriage to compensate for error in the feed of the member by the feed means.

4. In a machine, a member, a carriage, means for advancing the carriage along a predetermined path with a predetermined accuracy, a magnetostrictive element connecting the carriage to the member, an electrical coil on the magnetostrictive element, electrical means for measuring the position of the member, and means responsive to the electrical means for supplying current to the coil in accordance with error in position of the member.

5. In a machine, an electrostatic screw, an electrostatic nut movable coaxially relative to the screw, a feed screw, a feed carriage movable by the feed screw, means for rotating the screws, means including a magnetostrictive transducer device for connecting the nut and the feed carriage, bridge circuit means connected to the electrostatic nut and screw for measuring longitudinal decentering therebetween, and means responsive to the bridge circuit means for supplying power to the magnetostrictive transducer device to adjust the nut relative to the carriage in accordance with the amount of longitudinal decentering of the nut relative to the electrostatic screw.

6. In a machine for grinding a lens surface on a lens blank, a blank holder, means for rotating the blank holder, a grinding tool, a tool carriage supporting the grinding tool, means for advancing the tool carriage relative to the lens blank within predetermined limits of accuracy, means for measuring error in the advancement of the tool, and transducer means responsive to the measuring means for adjusting the tool relative to the advancing means to correct the error in the advancement of the tool.

7. In a machine, a member, a first carriage for moving the member along a predetermined path, feed means for moving the carriage along the predetermined path with a predetermined accuracy, variable capacitance means varied in accordance with the error of movement of the carriage, electrical means for measuring the variance in capacitance of the variable capacitance means, and transducer means connecting the member adjustably to the carriage and operable by the electrical means to adjust the member relative to the carriage so as to compensate for error in the feed of the member by the feed means.

8. In a machine, an electrostatic screw, an electrostatic nut movable coaxially relative to the screw, a feed screw, a feed carriage movable by the feed screw, means for rotating the screws, means including a magnetostrictive transducer device for creating relative longitudinal movement between the threads of the nut and the electrostatic screw, bridge circuit means connected to the electrostatic nut and electrostatic screw for measuring longitudinal decentering therebetween, and means responsive to the bridge circuit means for supplying power to the magnetostrictive transducer device whereby said transducer device will compensate for error in the feed of the feed carriage by the feed screw.

9. In a servo system, a drive carriage, a feed screw for driving the drive carriage, a second carriage driven by the drive carriage, an electrostatic nut carried by the second carriage, an electrostatic screw extending through the electrostatic nut, means including a transducer coupling the feed screw to the electrostatic screw, and circuit means connected to the nut and the electrostatic screw for actuating the transducer to rotate the electrostatic screw relative to the electrostatic nut whereby any error in the feed of said second carriage will be compensated for by said transducer.

References Cited in the file of this patent

UNITED STATES PATENTS

| | | |
|---|---|---|
| 2,611,964 | Buisson | Sept. 30, 1952 |
| 2,843,975 | Kamm | July 22, 1958 |